Figure 1:
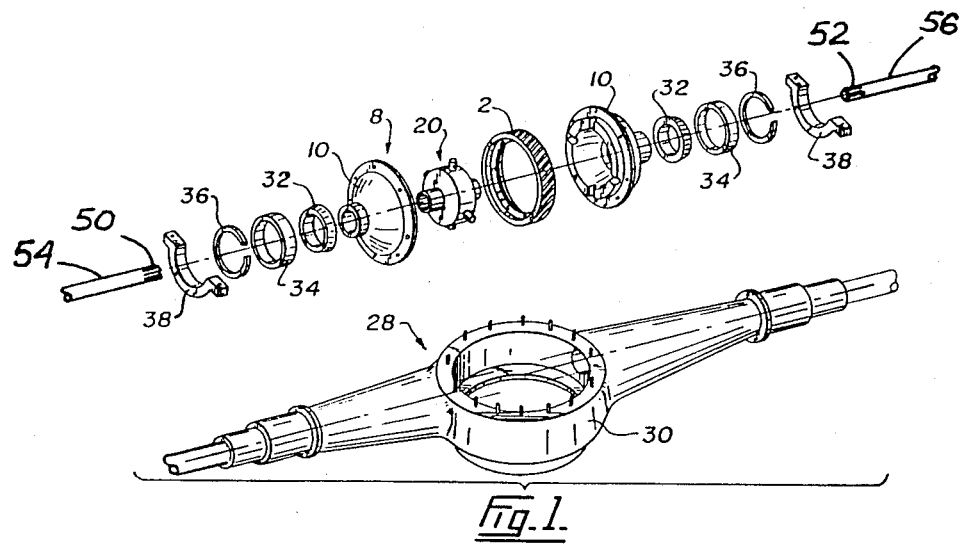

United States Patent [19]

Littke

[11] Patent Number: 4,977,796
[45] Date of Patent: Dec. 18, 1990

[54] DRIVE SYSTEM FOR RAILROAD TRACK VEHICLE

[75] Inventor: Mark E. Littke, Kamloops, Canada

[73] Assignee: Brentwood Enterprises, Ltd., Burnaby, Canada

[21] Appl. No.: 438,975

[22] Filed: Nov. 20, 1989

Related U.S. Application Data

[63] Continuation of Ser. No. 627,807, Jul. 5, 1984, abandoned.

[30] Foreign Application Priority Data

Jul. 5, 1983 [CA] Canada .................................. 431820

[51] Int. Cl.⁵ ............................................. F16H 37/06
[52] U.S. Cl. ................................. 74/665 T; 74/665 F; 74/607; 74/650; 295/40
[58] Field of Search ...................... 74/640, 650, 665 F, 74/665 G, 665 GA, 665 S, 665 T, 607, 606 R, 710; 105/96, 117; 295/36 R, 38, 39, 40; 180/348, 349, 359, 360, 378, 905

[56] References Cited

U.S. PATENT DOCUMENTS

| | | |
|---|---|---|
| 359,827 | 3/1887 | White ................................ 295/39 |
| 371,936 | 10/1887 | Hartman ............................ 295/40 |
| 415,955 | 11/1889 | Blackmore ........................ 295/40 |
| 653,877 | 7/1900 | Perret ................................ 74/607 |
| 672,949 | 4/1901 | Massey ............................. 295/40 |
| 1,430,744 | 10/1922 | Lewis ................................ 74/650 |
| 1,437,453 | 12/1922 | Sheckler ........................... 74/650 |
| 2,073,829 | 3/1937 | Brown .......................... 295/38 X |
| 2,222,603 | 11/1940 | Burrows et al. ............. 295/36 R X |
| 2,862,458 | 12/1958 | Lewis .......................... 105/117 X |
| 4,104,931 | 8/1978 | Tomich ............................ 74/650 |
| 4,402,238 | 9/1983 | Craig ................................ 74/710 |
| 4,484,484 | 11/1984 | Wissink et al. ............. 74/665 T X |
| 4,529,241 | 7/1985 | Jungbert ............................ 295/38 |
| 4,561,518 | 12/1985 | Grinde .......................... 74/650 X |
| 4,644,818 | 2/1987 | Choma et al. ..................... 74/650 |
| 4,815,338 | 3/1989 | Holan et al. ................. 74/710 X |

FOREIGN PATENT DOCUMENTS

| | | | |
|---|---|---|---|
| 875531 | 3/1953 | Fed. Rep. of Germany .... 295/36 R |
| 574295 | 9/1924 | France ................................ 180/75 |
| 1348 | 11/1887 | Sweden ............................... 295/39 |

*Primary Examiner*—Dwight Diehl
*Attorney, Agent, or Firm*—Spensley Horn Jubas & Lubitz

[57] ABSTRACT

A differential adapter is provided for adapting a typically standard axle assembly to use in a railroad track vehicle. Such an axle assembly has a spur gear, a differential case with a plurality of radially extending openings, connected to the spur gear, and has two axle sections each with a splined inner end. The adapter is dimensioned to fit within the differential case and comprises a body with two axially extending, axially aligned splined openings therein which are dimensioned to mate with respective splined inner ends the axle sections. The adapter also comprises a plurality of lugs extending radially outward from the body, and dimensioned and spaced apart thereon so as to snugly fit within respective radially extending openings in the differential case when the openings in the body mate with the respective inner ends of the axle sections. A differential and axle assembly which preferably utilizes such an adapter is also provided.

6 Claims, 1 Drawing Sheet

DRIVE SYSTEM FOR RAILROAD TRACK VEHICLE

This is a continuation of application Ser. No. 627,807 filed July 5, 1984, now abandoned.

This invention relates to a drive system, in particular a differential and components relating thereto, which is particularly useful for a railroad track vehicle.

Conventional drive systems for a railroad track or other vehicles, which may utilize a standard differential arrangement, suffer from the usual disadvantage of such differentials that if one wheel connected thereto through an axle section, should slip, the vehicle will be stalled. For vehicles such as automobiles, such a problem is not particularly severe. However, for railroad track vehicles the problem is particularly severe due to the relatively low coefficient of friction between the steel track and usually steel wheel. As a result, even small amounts of water, ice, dirt, or other foreign substance on the railroad track can cause slippage of one wheel driven by a standard differential with consequent stalling of the railroad track vehicle. To prevent such a problem, it would be preferable if the two wheels on any axle could be locked together to prevent such slippage.

The two wheels on a particular axle can be locked together by providing what is commonly known as a limited slip differential. Such limited slip differentials are not readily available for a heavy duty drive system, as would be required for a railroad track vehicle. As well, such differentials have a disadvantage that any kind of slippage on one axle section followed by sudden engagement of either axle section, would in a heavy duty drive system like that for a railroad track vehicle, place considerable strain on an axle section when it is suddenly driven in such a manner. Such strain could eventually result in fracturing of an axle section. Another possible solution to the above problem is simply to provide a solid axle with an attached drive gear. However, such an axle and attached drive gear would have to be fabricated. In addition such a solution also suffers from the disadvantage that should repairs be required to one axle section or its associated wheel or other associated components, it is necessary to remove and in some cases repair, the entire axle.

It is desirable then to provide a drive system for a railroad track vehicle which can be primarily constructed from readily available components, and in which the two axle sections are locked together for rotation although each axle section can be separately withdrawn when necessary.

A differential adapter is provided. The differential adapter is for an axle assembly having a spur gear, a differential case with a plurality of radially extending openings, connected to the spur gear, and having two axle sections each with a splined inner end. The adapter is dimensioned to fit within the differential case and comprises a body with two axially extending, axially aligned splined openings therein which are dimensioned to mate with respective inner ends of the axle sections. The adapter also comprises a plurality of lugs extending radially outward from the body. The lugs are dimensioned and spaced apart on the body so as to snugly fit within respective radially extending openings in the differential case and retain the body in axial alignment with the spur gear. Preferably, the lugs are cylindrical.

A railroad track vehicle differential is also provided which utilizes a differential comprising a spur gear, and a differential adapter. The differential adapter has a body as previously described. The differential is also provided with connecting means extending between the adapter and the spur gear, for rigidly connecting the adapter in axial alignment with the spur gear so as to rotate therewith.

Preferably, the railroad track vehicle differential comprises a spur gear, and a differential case axially aligned with and connected to the spur gear. The differential case has a plurality of radially extending openings, and two axially aligned, axially extending openings which are dimensioned to accommodate therethrough respective inner ends of two axle sections. Such a differential also comprises a differential adapter having a body and lugs as previously described.

Preferably, the spur gear of the differential has an annular flange disposed on an inner periphery of it, and the differential case has two transverse half sections connected to respective sides of the annular flange.

Usefully, the radially extending openings in the differential case are substantially cylindrical, and the lugs of the differential adapter are cylindrical.

A railroad track vehicle is also provided, which has an axle assembly comprising a spur gear, two axially aligned axle sections each having a splined inner end, and a differential adapter having a body as previously described. The axle assembly also comprises connecting means as previously described.

Usefully, the railroad track vehicle has an axle assembly comprising a spur gear, two axially aligned axle sections, each with a splined inner end, and a differential case. The differential case is axially aligned with and connected to, the spur gear, and has a plurality of radially extending openings, and two axially aligned, axially extending openings which accommodate therethrough respective inner ends of the axle sections. This axle assembly also comprises a differential adapter having a body and lugs as previously described.

Advantageously, the spur gear, differential case, and the lugs of the differential adapter, are constructed as previously described.

Figure 2:
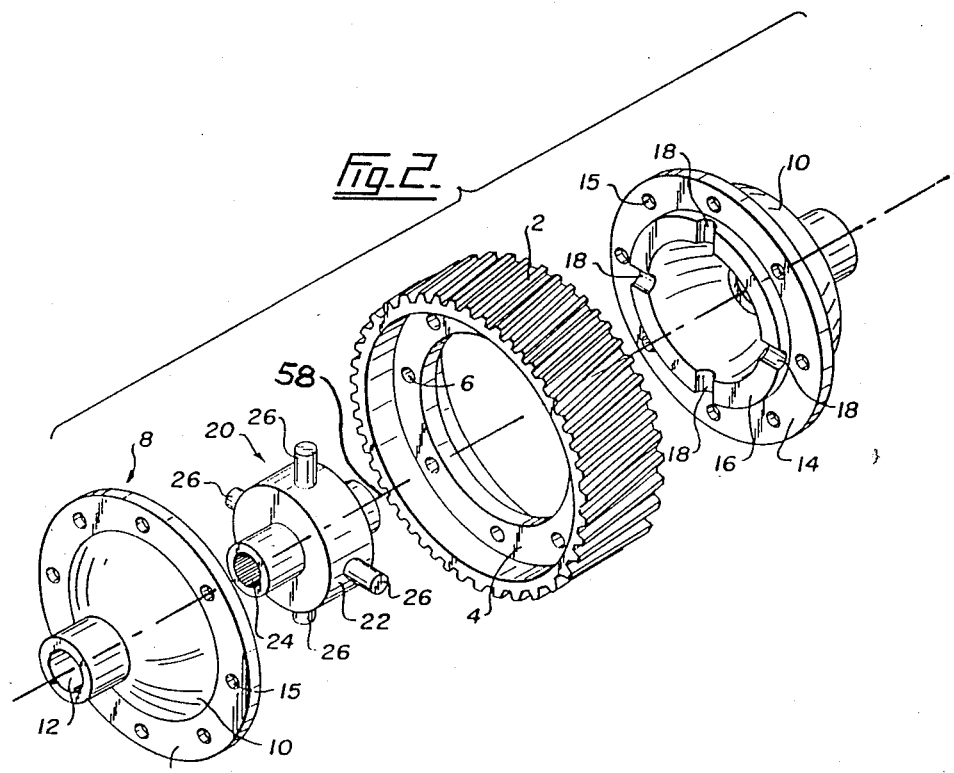

Embodiments of the invention will now be described with reference to the drawings in which:

FIG. 1 is a perspective, exploded view showing a differential of the present invention and some associated components of an axle assembly; and FIG. 2 is a perspective, exploded view of the differential shown in FIG. 1.

Referring first to FIG. 2, a railroad track vehicle differential is disclosed which comprises a spur gear 2 having an annular flange 4 disposed on an inner periphery of it. The annular flange 4 is provided with a plurality of holes 6 spaced apart thereon. A differential case 8 has two transverse half sections 10, each with an axially extending, axially aligned opening 12. Referring to FIG. 1, the openings 12 are dimensioned to accommodate therethrough inner ends 50 and 52 of corresponding axle sections 54 and 56. Referring back to FIG. 2, each half section 10 of the differential case 8 is also provided with an outwardly extending flange 14 having a plurality of holes 15 spaced thereon, which holes align with the holes 6 in the flange 4 of the spur gear 2. Each half section 10 also has an axially extending flange 16 with four semicylindrical openings 18 symmetrically spaced thereon. The half sections 10 are assembled on the spur gear 2 by means of bolts passing through aligned holes 6 and 15 on each half section 10 and holes 6 on the flange 4. When assembled, the differential case 8 will have four symmetrically spaced, radially extending, substantially cylindrical openings formed by adjacent semicylindrical recesses 18.

The differential shown also comprises a differential adapter 20 which is disposed within the differential case 8. The adapter 20 has a cylindrical body 22 having a rotational axis 58 and two axially extending, axially aligned splined openings 24 in it. The splined openings 24 communicate with one another and actually form a continuous axially aligned splined bore through the body portion 22. The splined openings 24 are dimensioned to mate with respective splined inner ends 50 and 52 of the axle sections 54 and 56 of FIG. 1. Referring to FIGS. 1 and 2, the adapter 20 is also provided with four symmetrically spaced, cylindrical shaped lugs extending radially outward from the body 22 perpendicular to the rotational axis 58. The lugs 26 snugly fit within respective substantially cylindrical openings in the differential case each again formed by two adjacent semicylindrical recesses 18 when the openings 24 in the body 20 mate with the respective splined inner ends 50 and 52 of the axle sections 54 and 56.

Referring to FIG. 1, the arrangement of the preceding railroad track vehicle differential is disclosed in relation to some associated components of an axle assembly. Such an axle assembly utilizes a housing 28, which has a central portion 30 into which the remainder of the components shown will be fitted in a manner well known for a standard differential. All of the components in fact shown, other than the differential adapter 20 are standard components encountered in a standard heavy duty axle as might be used in a heavy duty truck. Such components include the spur gear 2, differential case 10, differential bearings 32, differential bearing cups 34, differential bearing split adjusting rings 36, and differential bearing caps 38, and the housing 28 itself. By providing two axially aligned axle sections with splined inner ends, and other well known components associated with driving the spur gear 2, one will obtain a complete railroad track vehicle axle assembly of the present invention.

The differential adapter 20 shown, is typically made of hardened steel with the remainder of the components of the railroad track vehicle differential or axle assembly being made in the usual manner. The differential and axle assembly described are readily produced from a standard heavy duty axle assembly by removing the differential spider, attached differential side gears and pinions, and their associated thrust washers, and replacing them with an appropriately dimensioned differentially adapter as described. The components can then be assembled basically in the same manner as is well known with a standard heavy duty axle assembly, except that the differential adapter 20 is now disposed within the differential case 8 rather than the differential spider and attached gears, pinions and thrust washers. The axle assembly can then be installed on a railroad track vehicle, provision being made on the vehicle for mounting of the housing 28 and journalled mounting of the outer ends (not shown) of the two axle sections 54 and 56. The drive shaft can then be connected to a drive pinion (not shown), the latter again being a component of a standard heavy duty differential. In the result, an axle assembly will be obtained which has been fabricated from a readily available standard heavy duty axle assembly, and a differential adapter 20. Such an axle assembly will have its two axle sections locked together so that a wheel on a corresponding axle section will not slip on its track while the other remains stationary, thereby resulting in stalling of a railroad track vehicle equipped with such an axle assembly. Provided there is sufficient frictional engagement with a corresponding wheel of either axle section with its track, such a railroad track vehicle will move with sufficient engine output. Should one wheel or its attached corresponding axle section require servicing, that wheel and its axle section can be withdrawn from the differential assembly in the usual manner, the splined inner end of such an axle section slipping easily out of its mating splined opening 24 in the body 22.

Various modifications in the invention are of course possible. For example, the differential adapter can have lugs of a shape other than cylindrical, the only requirement being that such lugs fit snugly within the radially extending openings in the differential case when the openings in the body mate with the respective splined inner ends of the axle sections. In addition, it is also possible to construct a differential which utilizes other means for rigidly connecting the differential adapter in axial alignment with the spur gear. The only requirement for such means is that a rigid connection as described be obtained. That is, that the differential adapter is forced to rotate with the spur gear. However, it is advantageous to utilize a differential having a differential case, and an adapter having lugs as described, these together acting as a connecting means, since a differential with a differential case as described is standard equipment and is readily available for heavy duty applications. Also, it is possible to utilize a differential case which could for example be attached to one side of the annular flange disposed on an inner periphery of the spur gear. However, again to maintain construction utilizing standard readily available components, it is preferred that the construction described to be used.

As will be apparent to those skilled in the art in the light of the foregoing disclosure, many alterations and modifications are possible in the practice of this invention without departing from the spirit or scope of it. Accordingly, the scope of the invention is to be construed in accordance with the substance defined by the following claims.

The embodiments of the invention in which an exclusive property or privilege is claimed are defined as follows:

1. An axle adapter comprising:
   a unitary body having opposite sides with two splined openings aligned along an axis, said sides being fixedly connected to each other, whereby rotation of one splined opening relative to the other splined opening is prevented; and a plurality of lugs extending radially outwards from said body.

2. An adapter as claimed in claim 1 wherein said body is cylindrical and has a continuous axially aligned splined bore therethrough, the splined openings being respective openings of the bore.

3. An adapter as claimed in claim 2 wherein the bore has splines which project radially inwards and extend substantially the length of the bore.

4. An adapter as claimed in claim 1 wherein there are four said lugs 90° apart, the lugs having a cylindrical shape.

5. A direct drive axle assembly comprising:
   (a) a spur gear;

(b) first and second axles having respective inner ends;

(c) means for connecting the spur gear to the inner ends of the first and second axles such that rotation of the spur gear causes corresponding rotation of both axles in unison with the spur gear, for preventing rotation of one axle with respect to the other axle and for preventing rotation of the axles with respect to the spur gear, the means including:

(i) a differential case connected to the spur gear to rotate in unison therewith, the differential case including two transverse half sections each having a plurality of semi-cylindrical openings extending radially therein, the transverse half sections being connectable to each other such that the semi-cylindrical openings of one transverse half section are aligned with the semi-cylindrical openings of the other transverse half section to form cylindrical openings; and (ii) a unitary body within the differential case between the two transverse half sections, the body having opposite sides with two splined openings aligned along an axis and a plurality of lugs extending outwards from said body, the lugs being received within said cylindrical openings, said sides being fixedly connected to each other, whereby rotation of one said splined opening relative to the other splined opening is prevented, the respective inner ends of the first and second axles being received in respective splined openings.

6. A direct drive axle assembly as claimed in claim 5 wherein said spur gear has an inner periphery having an annular flange and said transverse half sections are connected to respective sides of the annular flange.

* * * * *